United States Patent Office 2,951,092
Patented Aug. 30, 1960

2,951,092

TRIAMINE DERIVATIVES

Francis A. Sowinski, Nixon, William A. Lott, Maplewood, and Jack Bernstein, New Brunswick, N.J., assignors to Olin Mathieson Chemical Corporation, New York, N.Y., a corporation of Virginia No Drawing. Filed Dec. 13, 1956, Ser. No. 628,010

3 Claims. (Cl. 260—553)

This invention relates to new triamines and, more particularly, to bases of the structural formula

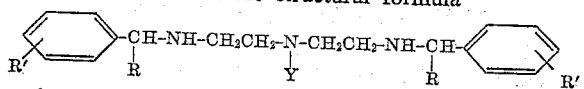

and acid-addition salts thereof wherein R is hydrogen, phenyl, halophenyl, (lower alkyl)phenyl or (lower alkoxy)phenyl; R' is hydrogen, halogen, lower alkyl or lower alkoxy; and Y is hydrogen or acyl [particularly lower alkanoyl, carbamyl, (lower (lower alkyl)carbamyl or di(lower alkyl)carbamyl].

Examples of suitable acid-addition salts of the free base compounds of this invention include the mineral acid salts, such as the hydrohalides (e.g., hydrochloride, hydrobromide and hydroiodide), the sulfate and the phosphate, and the organic acid salts, such as the acetate, the citrate, tartrate, oxalate, ascorbate and succinate. Included by the term "acid-addition salts" within the purview of this invention are the mono-acid-addition salts, the di-acid-addition salts and, when Y is hydrogen, the tri-acid-addition salts.

The compounds of this invention are prepared by interacting diethylenetriamine with a ketone or aldehyde of the formula

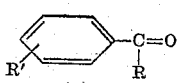

wherein R and R' are as hereinbefore defined. The conditions for the reaction are those usually employed in formation of Schiff bases. In order to form the desired disubstituted product, at least two moles of ketone or aldehyde are present per mole of triamine. The reaction results in the preparation of a di-imine, of the formula

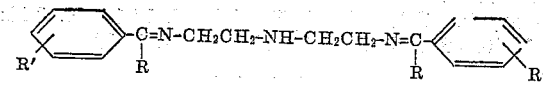

wherein R and R' are as above defined. These di-imines are then reduced by treatment with hydrogen in the presence of a hydrogenation catalyst (e.g., platinum, palladium or oxides thereof). At least two moles of hydrogen per mole of di-imine are employed to assure complete saturation of the imine bonds. As a practical matter, however, the reaction is usually carried out in an atmosphere of hydrogen so that this reagent is present in excess.

If an acylated product is desired (i.e., Y being acyl), the resulting triamine can be treated with an acylating agent, such as an isocyanate, acyl halide or acid anhydride (e.g., lower alkanoyl halides, such as acetyl chloride; carbamyl halides, such as carbamyl chloride, ethylcarbamyl chloride and dimethylcarbamyl chloride; lower alkanoic acid anhydrides, such as acetic anhydride or propionic anhydride; and lower alkyl isocyanates, such as ethylisocyanate). The acylating agent is preferably present in stoichiometric amount (i.e., one equivalent of acylating agent per mole of triamine). As an alternative (and preferred) procedure, the di-imine can be acylated prior to reduction to the triamine by treatment with an equivalent amount of one of the acylating agents listed above.

To form the acid-addition salts, the free base is treated with the desired acid. The nature of the salt formed will depend on the ratio of acid to base. If one equivalent of acid is present per mole of base, a mono-acid-addition salt is formed. If two equivalents of acid are present per mole of base, a di-acid-addition salt is the major product. If three or more equivalents of acid are present per mole of base and Y is hydrogen, then a tri-acid-addition salt is recovered.

Among the suitable ketones and aldehydes utilizable as initial reactants in the process of this invention may be mentioned benzaldehyde, halo-substituted benzaldehydes, lower alkyl substituted benzaldehydes (e.g., the tolualdehydes), lower alkoxy substituted benzaldehydes (e.g., the anisaldehydes), benzophenone, halo-substituted benzophenones, lower alkyl substituted benzophenones (e.g., the ditolyl ketones) and lower alkoxy substituted benzophenones (e.g., the phenyl anisoyl ketones). The particularly preferred compounds are those wherein R is phenyl and the phenyl rings are either unsubstituted or chloro substituted.

The compounds of this invention are useful as reagents for the precipitation of penicillins (e.g., penicillin G) from aqueous solutions and, hence, can be employed in the separation of penicillins from the fermentation broth filtrates in which they are produced. The compounds of this invention are also useful as agricultural fungicides in the treatment and prevention of pathogenic fungi infections, such as brown rot (in peaches, plums and other store fruit). For this purpose, the compounds are applied as aqueous sprays containing from about 5 to about 500 parts per million of active ingredient.

The following examples are illustrative, but by no means limitative, of the invention (all temperatures being in Centigrade):

EXAMPLE 1

N,N'-dibenzyldiethylenetriamine triacetate (a) N,N'-dibenzylidenediethylenetriamine: To a solution of 70.0 g. (0.66 mole) of benzaldehyde in 200 ml. of dry benzene cooled to 10° C. in an ice bath is added with vigorous stirring 31.0 g. (0.30 mole) of diethylenetriamine as a solution in 50 ml. of dry benzene dropwise at such a rate that no temperature rise occurs (40 min.). A steam bath is then substituted and the reaction mixture brought to the reflux point, a Dean-Stark water trap being interposed between the flask and the reflux condenser. After one-half hour, 10.5 ml. (97%; theory requires 10.8 ml.) of water is collected and although refluxing is continued for another one-half hour, there is no increase in the amount of water. The benzene and excess benzaldehyde are evaporated under reduced pressure (at 35 mm. for former and 2 mm. for latter) on the steam bath yielding about 88.2 g. (83.8 g.=theoretical yield) of a viscous oil.

Analysis—Calcd. for $C_{18}H_{21}N_3$: N, 15.04. Found: N, 14.39.

(b) N,N'-dibenzyldiethylenetriamine: A solution of 14.0 g. (0.05 mole) of the condensation product obtained in part a in 100 ml. of absolute alcohol is shaken at room temperature in the presence of 3.0 g. of palladized charcoal catalyst (5% Pd) and of hydrogen at 50 p.s.i. initial pressure. The reduction proceeds substantially to completion (99%) within 15 minutes, the uptake being equivalent to 8.7 lbs. pressure drop (8.77 lbs.=0.1 mole). Although shaking is continued for an additional 30 minutes, there is no further uptake. After the six (88.2 g.) runs are cooled to 5° C. and the catalyst separated by filtration, the alcohol is removed under partially reduced pressure yielding about 87.6 g. (98%) of the base.

(c) N,N'-dibenzyldiethylenetriamine, triacetate: To a solution of 87.6 g. (0.31 mole) of the triamine obtained in part b in a mixture of 1000 ml. of anhydrous ether and absolute alcohol (9:1) cooled in an ice bath is added slowly with rapid stirring 57.3 ml. (1 mole) of glacial acetic acid. The product is filtered and dried under reduced pressure, yield about 81.3 g., M.P. about 134.5–135.5°. It is recrystallized from 1650 ml. of a mixture of acetonitrile and ethyl acetate (2:1) and finally from dry acetonitrile (15 ml./g.), yield about 66.5 g. (47%) M.P. about 137.5–138.5°.

Analysis.—Calcd. for $C_{18}H_{25}N_3 \cdot 3C_2H_4O_2$: C, 62.17; H, 8.04; N, 9.06. Found: C, 62.06; H, 8.12; N, 8.81.

EXAMPLE 2

N,N'-bis(p-chlorobenzyl)-diethylenetriamine trihydrochloride (a) Di-p-chlorobenzylidenediethylenetriamine: To a suspension of 84.3 g. (0.6 mole) p-chlorobenzaldehyde in 300 ml. of dry benzene maintained at 7° C. with an ice bath, is added dropwise (½ hour) while stirring vigorously, 31.1 g. (0.3 mole) of diethylenetriamine in solution in 100 ml. of dry benzene. A steam bath is substituted for the cooling bath and the reaction mixture gradually brought to reflux temperature when a Dean-Stark water trap is interposed between the reflux condenser and the flask. After refluxing 1 hour, the volume of water collected becomes constant at 10.4 ml. (96%). The solvent is then removed under reduced pressure yielding 104 g. (quantitative yield) of a viscous red syrup which upon layering with dry hexane and standing at 5° C., crystallizes. Upon treating with activated carbon and recrystallizing the crude product (M.P. about 48–52°) from 550 ml. of hexane, about 88.5 g. of product melting at approximately 48–51° is obtained.

Analysis.—Calcd. for $C_{18}H_{19}Cl_2N_3$: N, 12.06. Found: N, 11.71.

(b) N,N'-bis(p-chlorobenzyl)-diethylenetriamine: In a solution of 17.4 g. (0.05 mole) of di-p-chlorobenzylidene-diethylenetriamine in 100 ml. of absolute alcohol is suspended 250 mg. of platinum dioxide catalyst and the mixture shaken in the presence of hydrogen at 50 p.s.i. and 50° C. After 1 hour, uptake ceases and the catalyst is replaced by a fresh portion and hydrogenation continued. There is a total uptake of 0.08 mole (80%) after shaking an additional hour, when uptake again stopped. The alcohol is removed on the steam bath under reduced pressure and the residue (about 17.4 g.) extracted with 150 ml. of anhydrous ether; upon removing the ether, about 12.6 g. of oil is obtained.

Analysis.—Calcd. for $C_{18}H_{23}Cl_2N_3$: N, 11.93. Found: N, 11.84.

(c) N,N'-bis(p-chlorobenzyl)diethylenetriamine, triacetate: To a well-cooled (ice bath) solution of 26.7 g. (0.076 mole) of the free base in 300 ml. of anhydrous ether, is added in small portions, while stirring vigorously, 14.4 g. (0.24 mole) of glacial acetic acid. The product is recrystallized two times from isopropanol (13 ml./g.), M.P. about 144.5–145°, yield about 22.4 g.

Analysis.—Calcd. for $C_{18}H_{23}Cl_2N_3 \cdot 3C_2H_4O_2$: C, 54.11; H, 6.62; N, 7.89. Found: C, 53.22; H, 6.97; N, 8.63.

The product is recrystallized again from 325 ml. of isopropanol to which acetic acid is added dropwise to an acid reaction moistened to Congo red paper, M.P. about 146.5–147.5°, yield about 19.3 g. A sample of this product recrystallizes without change in melting point.

Analysis.—Calcd. for $C_{18}H_{23}Cl_2N_3 \cdot 3C_2H_4O_2$: C, 54.11; H, 6.62; N, 7.89; acetyl group, 24.23. Found: C, 53.66; H, 7.11; N, 8.72; acetyl group, 22.32.

(d) N,N'-bis(p-chlorobenzyl)-diethylenetriamine, trihydrochloride: To a slurry of 19.2 g. (0.036 mole) of the triacetate obtained in part c in 250 ml. of water cooled in an ice bath is added gradually 48 ml. (0.12 mole) of 10% sodium hydroxide and the liberated oil is extracted with three 100-ml. portions of ether. The combined, dried ether extracts are cooled and while stirring vigorously, 21.8 ml. (0.12 mole) of 5.5 N ethereal hydrogen chloride is added. The product, yield about 12.2 g., M.P. about 281–283° (dec.), is recrystallized from 1200 ml. of 70% alcohol and again from an isopropanol and water mixture (2:1, ca. 140 ml./g.) to which 1 ml. of concentrated hydrochloric acid is added, M.P. about 298° (dec.), yield about 7.6 g. (46%, based on triacetate).

Analysis.—Calcd. for $C_{18}H_{23}Cl_2N_3 \cdot 3HCl$: C, 46.82; H, 5.67; Cl (ionic), 23.03. Found: C, 47.21; H, 5.80; Cl (ionic), 22.74.

Similarly, by substituting p-tolualdehyde or p-anisaldehyde for the p-chlorobenzaldehyde in the procedure of Example 2, there is obtained the trihydrochloride salt of N,N'-bis(p-methylbenzyl)-diethylenetriamine and N,N'-bis(p-methoxybenzyl)-diethylenetriamine, respectively.

EXAMPLE 3

1,1-bis(2-benzylaminoethyl)-3-ethylurea (a) 1,1-bis(2-benzylideneaminoethyl)-3-ethylurea: To a solution of 60.0 g. (0.215 mole) of dibenzylidenediethylenetriamine in 200 ml. of anhydrous ether maintained at 10° C. with an ice bath is added dropwise (½ hour) while stirring vigorously 14.2 g. (0.20 mole) of ethyl isocyanate as a solution in 100 ml. of anhydrous ether. After stirring 2 hours, the ether is evaporated on a hot water bath, yield of viscous oil about 74.6 g.

Analysis.—Calcd. for $C_{21}H_{26}N_4O$: N, 15.98. Found: N, 14.91.

(b) 1,1-bis(2-benzylaminoethyl)-3-ethylurea: A solution of 18.5 (0.05 mole) of the 1,1-bis(2-benzylideneaminoethyl)-3-ethylurea obtained in part a in 100 ml. of absolute alcohol is shaken in the presence of hydrogen at 50 p.s.i. initial pressure and 3.0 g. of palladized charcoal (containing 5% Pd) at 50° C. There is an initial uptake of 0.63 mole and after addition of a second portion of 3.0 g. of catalyst, an additional 0.23 mole; the total uptake is 0.86 mole (86%). Shaking is continued for an additional 45 minutes without further uptake.

The combined runs after cooling are separated from the catalyst by filtration and from the solvent by distillation on the steam bath under reduced pressure. The oil which remains (about 67.2 g.) readily crystallizes on trituration with a mixture of anhydrous ether and hexane (4:1). The yield of compound after filtration and washing with two 100-ml. portions of anhydrous ether is about 39.8 g. (56%), M.P. about 132° (dec.). It is then purified by recrystallization from isopropyl ether, to a constant M.P. of about 140–141°, yield approximately 25%.

Analysis.—Calcd. for $C_{21}H_{30}N_4O$: C, 71.14; H, 8.52; N, 15.80. Found: C, 71.30; H, 8.30; N, 15.70.

EXAMPLE 4

N,N'-dibenzhydryldiethylenetriamine triacetate (a) Dibenzhydrylidenediethylenetriamine: A mixture of 54.7 g. (0.30 mole) of benzophenone and 15.5 g. (0.15 mole) of diethylenetriamine in 250 ml. of dry toluene, to which one crystal of p-toluene sulfonic acid has been added, is refluxed in an apparatus in which a Dean-Stark water trap has been interposed between the flask and the reflux condenser until the theoretical amount of water, 5.4 ml. (0.30 mole), has been collected. This requires 50 hours. The toluene is then removed under reduced pressure yielding about 64.0 g. (99%) of a lightly colored syrup.

Analysis.—Calcd. for $C_{30}H_{29}N_3$: N, 9.73. Found: N, 9.41.

(b) N,N'-dibenzhydryldiethylenetriamine: To a solution of 21.6 g. (0.05 mole) of the Schiff's base obtained in part a in 100 ml. of absolute alcohol (final volume) is added an alcoholic suspension of 3.0 g. of palladized charcoal (5% Pd) and the mixture shaken in the presence of hydrogen at 50 p.s.i. initial pressure at 50° C. After 0.5 hour, 0.097 mole (97%) is taken up; and although shaking is continued under these conditions for an additional 1.5 hours, no further reduction occurs. The combined runs (3) are cooled to 5° C. and the catalyst separated by filtration. Upon removing the alcohol under reduced pressure, about 59.6 g. (93%) of product is obtained.

(c) N,N' - dibenzhydryldiethylenetriamine, triacetate: To a solution of 59.1 g. (0.136 mole) of the triamine obtained in part b in 500 ml. of a mixture of dry hexane and anhydrous ether (9:1) cooled in an ice bath is added with vigorous stirring 25.5 g. (0.425 mole) of glacial acetic acid. The product which precipitates as a gum is readily induced to crystallize by further cooling and scratching with a stirring rod. The product is filtered, washed with three 75-ml. portions of hexane and dried under reduced pressure, yield about 69.8 g., M.P. about 68–75°. After two recrystallizations from a mixture of ethyl acetate and hexane (1:2; ca. 6 ml./g.) about 56.5 g. (67%) of product of M.P. about 93.5–95° are obtained. The M.P., about 93–95°, remains substantially constant upon a further recrystallization.

Analysis.—Calcd. for $C_{30}H_{33}N_3 \cdot 3C_2H_4O_2$: C, 70.31; H, 7.36; N, 6.82. Found: C, 69.73; H, 7.39; N, 7.23.

Similarly, if p-chlorobenzophenone, di(p-tolyl)ketone or di(p-anisoyl)ketone is substituted for the benzophenone in part a of Example 4, there is obtained the triacetate salt of N,N'-di(p-chlorobenzhydryl)-diethylenetriamine, N,N' - di(p - methylbenzhydryl)-diethylenetriamine and N,N'-di(p-methoxybenzhydryl)-diethylenetriamine, respectively.

EXAMPLE 5

*1,1-bis(2-benzhydrylaminoethyl)-3-ethylurea dihydrochloride*

(a) 1,1 - bis(2-benzhydrylideneaminoethyl) - 3 - ethylurea: To a solution of 64.7 g. (0.15 mole) of dibenzhydrylidenediethylenetriamine in 200 ml. anhydrous ether maintained at 10° with an ice bath is added dropwise (one-half hour) while stirring vigorously 10.7 g. (0.15 mole) of ethylisocyanate in solution in 100 ml. of anhydrous ether. The ice bath is then removed and stirring continued for an additional three hours. Upon removing the solvent with a hot water bath under reduced pressure, about 75.4 g. (100%) of syrupy product is obtained.

Analysis.—Calcd. for $C_{33}H_{34}N_4O$: N, 11.14. Found: N, 10.84.

(b) 1,1-bis(2-benzhydrylaminoethyl) - 3 - ethylurea: The 1,1-bis(2-benzhydrylideneaminoethyl)-3-ethylurea is dissolved in absolute ethanol to make a total volume of 150 ml. Of this solution 50-ml. portions (0.05 mole) diluted with an additional 75 ml. of absolute alcohol are reduced over 3 g. of palladized charcoal (containing 5% Pd) with hydrogen at 50 lbs. p.s.i. initial pressure and 50° C. The hydrogen uptake after one hour is 0.099 mole (theory requires 0.1 mole) and does not increase upon shaking for an additional one-half hour.

The combined runs after cooling to 5° C. are separated from the catalyst by filtration and concentrated under reduced pressure on the steam bath to a viscous oil, yield about 71.9 g. (95%).

Analysis.—Calcd. for $C_{33}H_{38}N_4O$: N, 11.05. Found: N, 10.84.

(c) 1,1 - bis(2-benzhydrylaminoethyl)-3-ethylurea, dihydrochloride: To a well-cooled (ice bath) solution of 19.8 g. (0.137 mole) of the free base in 750 ml. of anhydrous ether is added in small portions while stirring vigorously 5.5 N ethereal hydrogen chloride until a drop of the solvent is acid to moistened Congo red paper. The product is filtered, washed with two 150-ml. portions of anhydrous ether and dried in a vacuum desiccator under reduced pressure. The product (about 73.7 g.) after recrystallization from 800 ml. of dry acetone melts constantly at about 166–168° (dec.), yield 65.0 g. (82%).

Analysis.—Calcd. for $C_{33}H_{38}N_4O \cdot 2HCl$: N, 9.63; Cl, 12.23. Found: N, 9.89; Cl, 12.10.

EXAMPLE 6

*1,1-bis(2-benzhydrylaminoethyl)-3,3-dimethylurea, dihydrochloride, hydrate*

(a) 1,1-bis(2-benzhydrylaminoethyl) - 3,3 - dimethylurea: To a solution of 21.8 g. (0.05 mole) of N,N'-dibenzhydryldiethylenetriamine and 5.1 g. (0.05 mole) of triethylamine in 200 ml. anhydrous ether maintained at reflux temperature on a water bath is added, with vigorous stirring, a solution of 5.4 g. (0.05 mole) of N,N-dimethylcarbamyl chloride in 50 ml. of anhydrous ether dropwise (30 min.). After refluxing with stirring for 2 hours, the reaction mixture is allowed to stand overnight. The precipitate of 7.0 g. of triethylamine hydrochloride is then filtered, washed with several small portions of anhydrous ether and the combined filtrate and washings evaporated to dryness on a hot water bath under reduced pressure, yield of viscous oil, about 23.2 g. (92%).

(b) 1,1-bis(2-benzhydrylaminoethyl)-3,3-dimethylurea, dihydrochloride, hydrate: To a solution of 23.2 g. (0.046 mole) of the base obtained in part a in 250 ml. of a mixture of dry hexane and anhydrous ether (1:1) [filtered with the aid of Hyflo (a filter aid) from a small amount of insoluble material] is added while cooling in an ice bath and stirring vigorously, ethereal hydrogen chloride, until the solvent is acid to Congo red. The product (24.8 g.) is recrystallized from methanol and anhydrous ether, yield about 19.4 g. (71%), M.P. about 138° (dec.). A sample of this product recrystallizes without change in melting point.

Analysis.—Calcd. for $C_{33}H_{38}N4O \cdot 2HCl \cdot H_2O$: C, 66.31; H, 7.08; Cl, 11.86. Found: C, 66.87; H, 7.39; Cl, 11.50.

Similarly, by substituting carbamyl chloride or methylcarbamyl chloride for the dimethylcarbamyl chloride in the procedure of part α of Example 6, there is formed 1,1-bis(2-benzhydrylaminoethyl)urea and 1,1-bis(2-benzhydrylaminoethyl)-3-methylurea, respectively.

EXAMPLE 7

*N,N-bis(2-benzhydrylaminoethyl)acetamide diphosphate sesquihydrate*

(a) N,N-bis(2-benzhydrylaminoethyl)acetamide: To a solution of 43.6 g. (0.1 mole) of dibenzhydryldiethylenetriamine and 10.1 g. (0.1 mole) of triethylamine in 300 ml. of dry benzene maintained at 10° C. with an ice bath is added with vigorous stirring a solution of 7.9 g. (0.1 mole) of acetyl chloride in 100 ml. of dry benzene dropwise (½ hour). A steam bath is then substituted for the ice bath and the reaction mixture stirred one hour under reflux. After cooling, the triethylamine hydrochloride (13.4 g., 97%, M.P. 252°, lit. M.P. 253–254°) is separated by filtration and the solvent, by distillation under reduced pressure from a steam bath, yields about 46.2 g. (97%) of an oil.

Analysis.—Calcd. for $C_{32}H_{35}N_3O$: N, 8.79. Found: N, 8.52.

(b) N,N-bis(2-benzhydrylaminoethyl)acetamide, dihydrochloride, hydrate: To a solution of 46.2 g. (0.096 mole) of the free base obtained in part a in 500 ml. of anhydrous ether cooled in an ice bath is added gradually while stirring vigorously 91.0 ml. of 2.2 N ethereal hydrogen chloride (0.20 mole). The product, (about 43.5 g.) after reprecipitation from absolute ethanol (300 ml.) with anhydrous ether and recrystallization from the same solvent (1200 ml.), melts at about 197–198° without being altered by further recrystallization, yield about 24.7 g.

*Analysis.*—Calcd. for $C_{23}H_{35}N_3O \cdot 2HCl$: C, 69.80; H, 6.77; Cl, 12.88. Calcd. for $C_{23}H_{35}N_3O \cdot 2HCl \cdot H_2O$: C, 67.59; H, 6.91; Cl, 12.47. Found: C, 67.59; H, 6.93; Cl, 12.61.

(c) N,N-bis(2-benzhydrylaminoethyl) acetamide, diphosphate, sesquihydrate: to a cooled solution (ice bath) of 23.3 g. (0.042 mole) of the dihydrochloride obtained in part *b* in 200 ml. dimethylformamide is added with stirring 40 ml. (0.1 mole) of 10% sodium hydroxide and the liberated base precipitated with the addition of 200 ml. of water and extracted with three 250-ml. portions of ether. The combined, dried extracts are cooled and a solution of 10.4 g. of 85% phosphoric acid (0.09 mole) in 100 ml. of anhydrous ether is added with stirring. The product precipitates as a gum and is crystallized by trituration in 100 ml. of a mixture of acetone and water (9:1), yield about 27.2 g., M.P. about 187° (dec.). This product (25.0 g.) is recrystallized from 350 ml. of boiling water, yield about 14.4 g. (48% calcd. as sesquihydrate), melting point about 197° (dec.). This material, upon recrystallization of a melting point sample, melts constantly. A sample is dried to constant weight by heating at 138° under reduced pressure and submitted for analysis.

*Analysis.*—Calcd. for $C_{32}H_{35}N_3O \cdot 2H_3PO_4$: N, 6.23; P, 9.19. Found: N, 6.10; P, 9.36.

Moisture determination.

*Analysis.*—Calcd. for $C_{32}H_{35}N_3O \cdot 2H_3PO_4 \cdot 1\text{-}½\, H_2O$: $H_2O$, 3.84. Found: $H_2O$, 3.67.

The invention may be otherwise variously embodied within the scope of the appended claims.

We claim:

1. A compound selected from the group consisting of bases of the structural formula

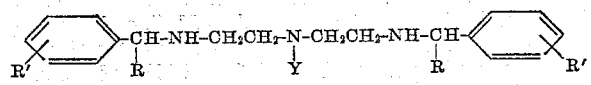

and acid-addition salts thereof, wherein R is selected from the group consisting of hydrogen, phenyl, chlorophenyl, (lower alkyl)phenyl and (lower alkoxy)phenyl; R' is selected from the group consisting of hydrogen, halogen, lower alkyl and lower alkoxy; and Y is selected from the group consisting of lower alkanoyl, carbamyl, (lower alkyl)carbamyl and di(lower alkyl)carbamyl.

2. 1,1-bis(2-benzhydrylaminoethyl)-3-(lower alkyl)urea.

3. 1,1-bis(2-benzhydrylaminoethyl)-3-ethylurea.

References Cited in the file of this patent

UNITED STATES PATENTS

| | | |
|---|---|---|
| 2,453,057 | Zienty | Nov. 2, 1940 |
| 2,489,363 | Bersworth | Nov. 29, 1949 |
| 2,619,502 | Williams et al. | Nov. 25, 1952 |
| 2,624,759 | Bersworth | Jan. 6, 1953 |
| 2,772,312 | Southwood | Nov. 27, 1956 |

FOREIGN PATENTS

| | | |
|---|---|---|
| 656,043 | Great Britain | Aug. 3, 1951 |